(12) United States Patent
Lukassen

(10) Patent No.: US 9,157,759 B2
(45) Date of Patent: Oct. 13, 2015

(54) ROUTE PREVIEW

(75) Inventor: Robert Lukassen, Veldhoven (NL)

(73) Assignee: TOMTOM INTERNATIONAL B.V., Amsterdam (NL)

( * ) Notice: Subject to any disclaimer, the term of this patent is extended or adjusted under 35 U.S.C. 154(b) by 842 days.

(21) Appl. No.: 12/736,834

(22) PCT Filed: Oct. 7, 2008

(86) PCT No.: PCT/EP2008/063404
§ 371 (c)(1),
(2), (4) Date: Dec. 20, 2010

(87) PCT Pub. No.: WO2010/040389
PCT Pub. Date: Apr. 15, 2010

(65) Prior Publication Data
US 2011/0112750 A1    May 12, 2011

(51) Int. Cl.
*G01C 21/00*    (2006.01)
*G01C 21/36*    (2006.01)

(52) U.S. Cl.
CPC .................................. *G01C 21/3676* (2013.01)

(58) Field of Classification Search
USPC ........................................................ 701/400
See application file for complete search history.

(56) References Cited

U.S. PATENT DOCUMENTS

| | | | |
|---|---|---|---|
| 4,532,514 A * | 7/1985 | Hatano et al. | 340/995.19 |
| 5,612,881 A | 3/1997 | Moroto et al. | |
| 6,381,534 B2 | 4/2002 | Takayama et al. | |
| 8,032,298 B2 * | 10/2011 | Han | 701/455 |
| 8,306,736 B2 * | 11/2012 | Wu | 701/410 |
| 2001/0020211 A1 | 9/2001 | Takayama et al. | |
| 2002/0165665 A1 * | 11/2002 | Kim | 701/209 |
| 2006/0220923 A1 * | 10/2006 | Tanizaki et al. | 340/995.1 |
| 2007/0005233 A1 | 1/2007 | Pinkus et al. | |
| 2007/0103445 A1 | 5/2007 | Pinkus et al. | |
| 2007/0150173 A1 | 6/2007 | Neef et al. | |
| 2007/0150179 A1 | 6/2007 | Pinkus et al. | |

FOREIGN PATENT DOCUMENTS

| EP | 0660289 A1 | 6/1995 |
|---|---|---|
| WO | WO 2004/076978 A1 | 9/2004 |

* cited by examiner

*Primary Examiner* — Ariel Yu

(57) ABSTRACT

A navigation device includes: a route calculation module operable to calculate a route from a start location to a destination location; a rendering module configured to use digital map data to generate images of the route for display to a user; and a route preview module operable to provide the user with a preview of the calculated route. In at least one embodiment, the route preview module is operable to divide the calculated route into junction segments and road segments, and is configured to control the rendering module to display images representative of locations within the road segments at a higher display speed than images representative of locations within the junction segments.

13 Claims, 7 Drawing Sheets

ROUTE PREVIEW

FIELD OF THE INVENTION

The present invention relates, in general, to route preview functionality for navigation devices. Embodiments of the invention relate to a navigation device and a method of operating a navigation device that each provide such functionality.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems, either as devices that are permanently mounted in the vehicle or as devices that can be removed from the vehicle.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs of this type also include a GPS antenna by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server with which the user's computing resource is communicating calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the Go 720 model manufactured and supplied by TomTom International B.V., provide a reliable means for enabling users to navigate from one position to another. Such devices are of great utility when the user is not familiar with the route to the destination to which they are navigating.

With devices of this type, as aforementioned, it is possible for a user to opt to input a start location and a destination location, whereupon the device can be controlled to compute a navigation route from the start location to the destination location and ultimately be operated to provide the user with navigation instructions as they travel along the computed route from the start location to the destination.

As some users can find it difficult to react in time to navigation instructions provided along the route, particularly in circumstances where the user is distracted by traffic, it is commonplace for such devices to provide the user with the ability to preview a computed route—the intention being that once a route has been previewed navigation instructions provided to the user along the route will not be a complete surprise to the user (because the user has already viewed those instructions) and hence the user may be better able to correctly follow the provided navigation instructions.

A variety of different route preview configurations have previously been proposed. For example, the aforementioned TomTom Go 720 navigation device provides users with the option, inter alia, to preview a route as text, as a collection of discrete junction images or as a video of the entire route.

FIG. 6 is a schematic representation of a textual preview of a computed route that commences at Village Way, London and shows (from left to right) the distances between turnings, an icon representing the type of turn, and the name of the road into which the route passes once the turn has been made.

FIGS. 7a and 7b are schematic representations of elements of the same route as viewed using the junction image preview functionality. The screenshot shown in FIG. 7a corresponds to the first turning (into Burbage Road) shown in FIG. 6, and the screenshot shown in FIG. 7b corresponds to the next turning (into College Road) shown in FIG. 6. As shown, the static junction images are overlaid with the route 288 to be followed and an arrow 290 indicating the form of the manoeuvre that needs to be undertaken at each junction.

This route preview functionality provides the user with discrete rendered images of the junctions that make up the computed route, and the user can scroll back and forth between junction images by operating virtual scroll keys 292.

Whilst each of these techniques do provide the user with the ability to preview the computed route, only route junctions are shown and as such it is difficult for the user to easily appreciate distances between junctions.

To address this drawback it is also known to provide the user with the ability to view a video of the route, namely a series of rendered images displaying every part of the route and comprising in effect an ordered preview of all the static images that would be generated by the navigation device in the course of guiding a user along the route. FIG. 8b is a schematic illustration of one static image that makes up the video showing the route 288 to be followed overlaid with an arrow 290 indicating the type of the next manoeuvre, and an icon 294 (in effect a virtual vehicle) indicating the position of the vehicle on the route.

In this known arrangement the speed with which the virtual vehicle moves along the route in this video preview mode is adjusted so that, for example, the vehicle moves more quickly along highways than it does along suburban city streets, and so that the vehicle slows for junctions and manoeuvres. It is also known to provide the user, as shown in FIG. 8a, with the possibility of adjusting the speed at which the video is replayed from a 10% of normal speed to a 500% of normal speed by moving a slider 296 to the right to increase the display speed and to the left to reduce it.

Whilst this known functionality does greatly improve upon the display of a list of manoeuvres or a series of discrete static junction images, it is the case that for longer journeys it can take a considerable amount of time to preview the entire route and many users will not have the patience to watch, for example, a thirty minute video for a trip that would take actually take two hours to complete.

The user can, of course, speed up video replay, but as increasing the display speed of the video also increases the speed at which manoeuvres are undertaken, it can be difficult at higher display speeds to appreciate exactly what manoeuvre is required at any given junction. The solution to this problem would be to slow the video down, but in this instance it would take significantly longer to preview the entire route.

The combination of these factors can mean that users tend not to use the route preview functionality that is currently provided, and as that functionality can help users to familiarise themselves with the route and navigate safely it would be useful if alternative preview functionality could be proposed that avoided or at least addressed these drawbacks.

SUMMARY OF THE INVENTION

To this end, a first aspect of the present invention provides a navigation device comprising: a route calculation module operable to calculate a route from a start location to a destination location; a rendering module configured to use digital map data to generate images of said route for display to a user; and a route preview module operable to provide the user with a preview of the calculated route, characterised in that: the route preview module is operable to divide said calculated route into junction segments and road segments, and is configured to control said rendering module to display images representative of locations within said road segments at a higher display speed than images representative of locations within said junction segments.

In one embodiment the route preview module includes a route divider module configured to divide a calculated route into road segments and junction segments.

The route preview module may comprise a distance calculator module configured to calculate a distance for each said road segment.

The route preview module, in one implementation, is configured to vary the display speed of successive road segments.

In a preferred arrangement the route preview module is configured to vary the display speed of successive road segments in accordance with calculated road segment distances.

The route preview module may comprise a display speed module configured to calculate a display speed for road segments according to calculated road segment distances.

The display speed module may be configured to linearly increase the display speed of road segments with increase road segment distance.

The display speed module may be configured to control said rendering module to cull images for rendering in the event that a calculated display speed for a road segment exceeds a maximum display speed for a processor of said navigation device.

In an envisaged implementation the route preview module may be configured to control said rendering module to gradually increase the display speed in the region of a transition between a junction segment and a road segment, and to gradually decrease the display speed in the region of a transition between a road segment and a junction segment.

In a preferred arrangement, the route preview module may be controllable to cause said rendering module to only generate images representative of locations within junction segments. The rendering module may be configured to implement video processing techniques to smooth transitions from one displayed junction segment to another.

Another aspect of the invention relates to a method of operating a navigation device comprising the steps of: controlling a route calculation module to calculate a route from a start location to a destination location, controlling a rendering module to use digital map data to generate images of said route for display to a user; and controlling a route preview module to provide the user with a preview of the calculated route, characterised by the steps of: dividing said calculated route into junction segments and road segments, and controlling said rendering module to display images representative of locations within said road segments at a higher display speed than images representative of locations within said junction segments.

The method may further comprise the step of varying the display speed of successive road segments. In another envisaged implementation, the method may comprise the step of calculating the distance of road segments. In another implementation, the method may comprise the step of varying the display speed of road segments in accordance with calculated road segment distances.

Yet another aspect of the present invention relates to a computer program comprising one or more computer program modules configured, when executed by a processor resource, to cause the processor resource to implement a method as described herein. In another aspect, the computer program may be embodied on a computer readable medium.

Another aspect of the present invention relates to a navigation device comprising a route divider module that is configured to identify junction segments of a calculated route, and to control a rendering module of said navigation device to generate an animation of a vehicle traversing successive junction segments along said route.

Advantages of these embodiments are set out hereafter, and further details and features of each of these embodiments are defined in the accompanying dependent claims and elsewhere in the following detailed description.

It is thus possible to provide a powerful means for improving upon existing route preview functionality. In particular the teachings of the present invention can enable the time required to preview a given route to be reduced, and as such it is anticipated that the route preview functionality herein described will be less tedious than existing arrangements, and hence that users will be more likely to avail themselves of this functionality when using their navigation device.

BRIEF DESCRIPTION OF THE DRAWINGS

Illustrative embodiments of the invention will now be described, by way of example only, with reference to the accompanying drawings, in which.

DETAILED DESCRIPTION OF PREFERRED EMBODIMENTS

Figure 1:
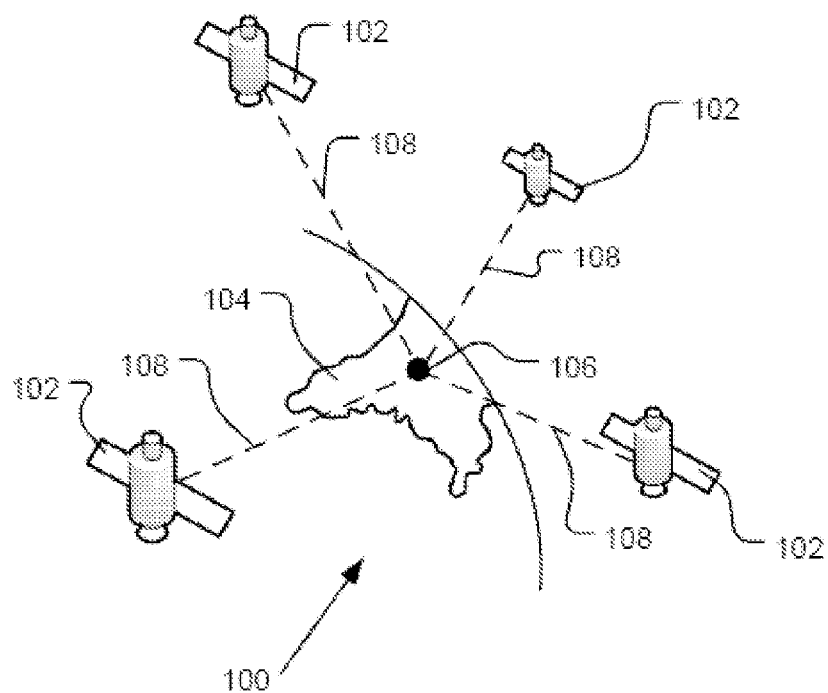
FIG. 1 is a schematic illustration of an illustrative part of a Global Positioning System (GPS) usable by a navigation device.

Throughout the following description identical reference numerals will be used to identify like parts.

Embodiments of the present invention will now be described with particular reference to a PND. It should be remembered, however, that the teachings of the present invention are not limited to PNDs but are instead universally applicable to any type of processing device that is configured to execute navigation software so as to provide route planning and/or navigation functionality. It follows therefore that in the context of the present application, a navigation device is intended to include (without limitation) any type of route planning and navigation device, irrespective of whether that device comprises a PND, a device in a vehicle such as an automobile, or indeed a computing resource, for example a personal computer (PC) (portable or otherwise), a mobile telephone or a Personal Digital Assistant (PDA) executing route planning and navigation software.

It will also be apparent from the following that the teachings of the present invention are not limited solely to circumstances where users are following a computed route from an input start location to an input destination location, but are equally as useful when the user is using the device in the aforementioned free-driving mode.

With the above provisos in mind, reference will now be made to FIG. 1 of the accompanying drawings in which an illustrative satellite navigation system, in this instance, the Global Positioning System (GPS) is shown. In general, the GPS is a satellite-radio based navigation system that provides the possibility of continuously determining position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing known geometric triangulation techniques, the receiver utilizes the three known positions to determine its own two-dimensional position relative to the satellites. Additionally, by acquiring a fourth satellite signal the receiving device can calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
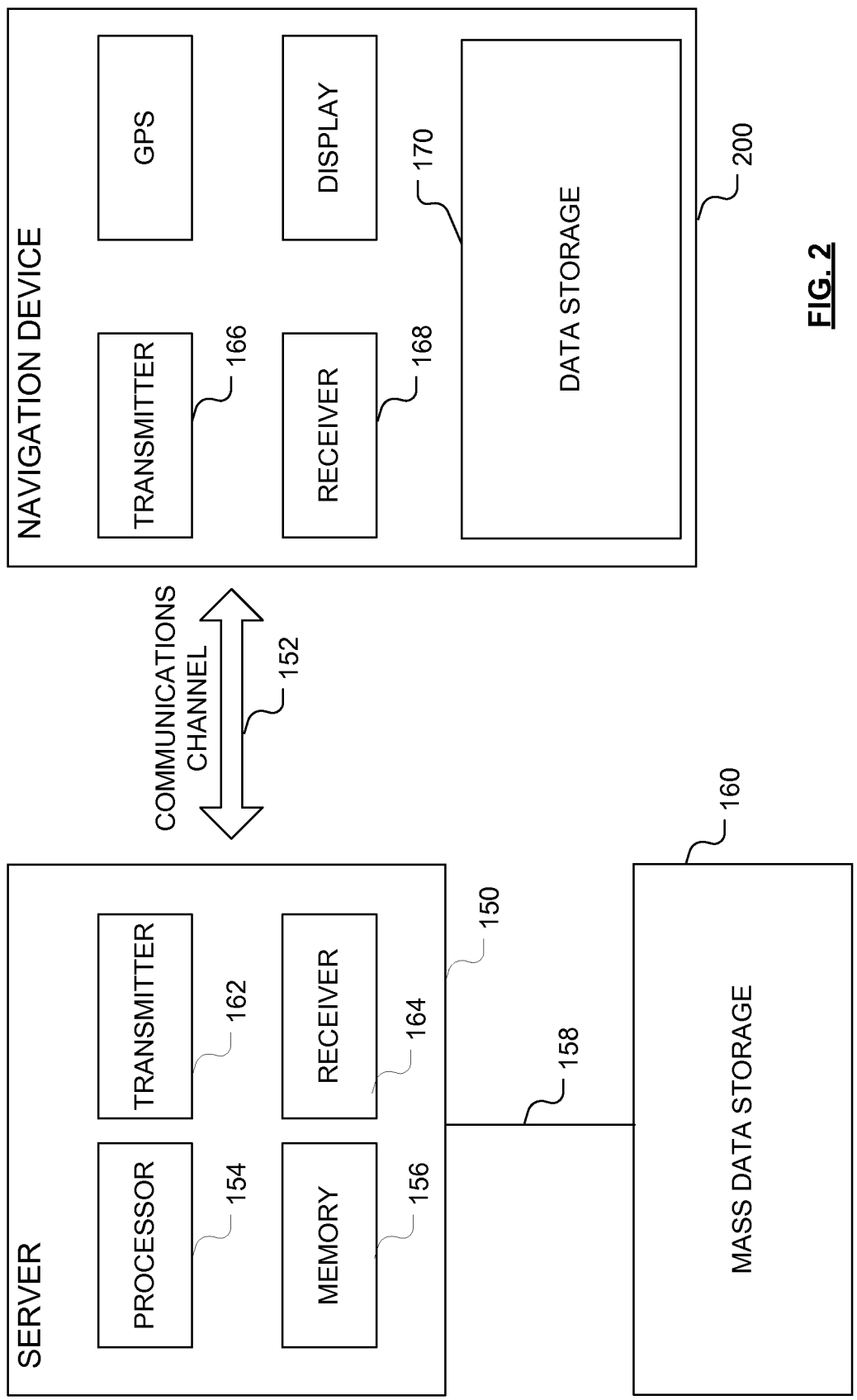
FIG. 2 is a schematic diagram of a communications system that may be employed to provide for communication between a navigation device and a server.

Turning to FIG. 2, a navigation device 200 comprising or coupled to the GPS receiver device 106, is capable of establishing a data session, if required, with network hardware of a "mobile" or telecommunications network via a mobile device (not shown), for example a mobile telephone, PDA, and/or any device with mobile telephony or communications functionality, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11a/b/c/g/n, etc.

Hence, it can be seen that the internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2.

The navigation device includes a data storage device 170 (which may comprise any combination of ROM, RAM and disk based or solid state storage device) as well as other hardware and/or functional parts, which will be described later herein in further detail.

Software stored in server memory 156 provides instructions for the processor 154 and allows the server 150 to provide services to the navigation device 200. In one configuration a service provided by the server 150 may involve processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an internet connection between the server 150 and the navigation device 200.

In general terms the server comprises a processing resource, comprising any number and type of processing devices (linked together or separate), remote from the navigation device 200 and with which the navigation device can communicate by means or a wired or wireless communications channel.

The navigation device 200 may be provided with information from the server 150 via information downloads which may be periodically updated automatically or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
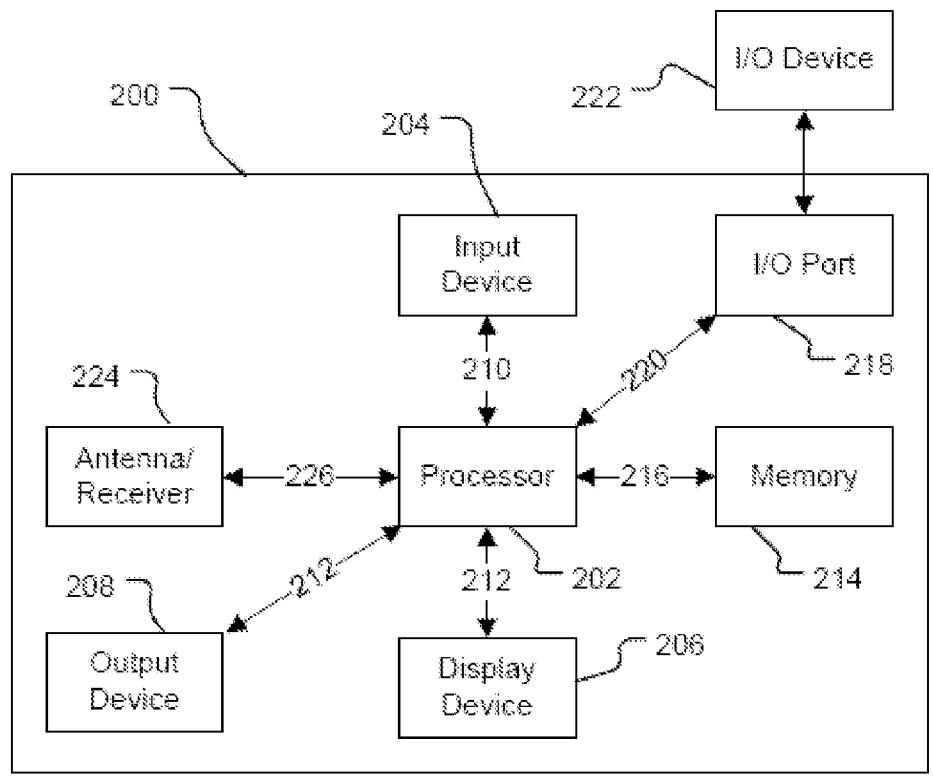
FIG. 3 is a schematic illustration of electronic components of an illustrative navigation device, for example the device of FIG. 2.

Referring to FIG. 3, it should be noted that the block diagram of the navigation device 200 is not inclusive of all components of the navigation device, but is only representative of many example components. The navigation device 200 is located within a housing (not shown). The navigation device 200 includes a processing resource comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example. In a preferred embodiment the processor is configured, in addition to functioning as a controller for the device, to function as a video processor that is operable to generate images for display on the display screen 206. In an alternative arrangement a discrete video processor may be provided.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it is should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 (which may comprise any combination of ROM, RAM, disk drive or solid state storage devices, and may be part of the aforementioned data storage device 170) via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

FIG. 3 further illustrates an operative connection between the processor 202 and an antenna/receiver 224 via connection 226, wherein the antenna/receiver 224 can be a GPS antenna/receiver for example. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use.

Figure 4:
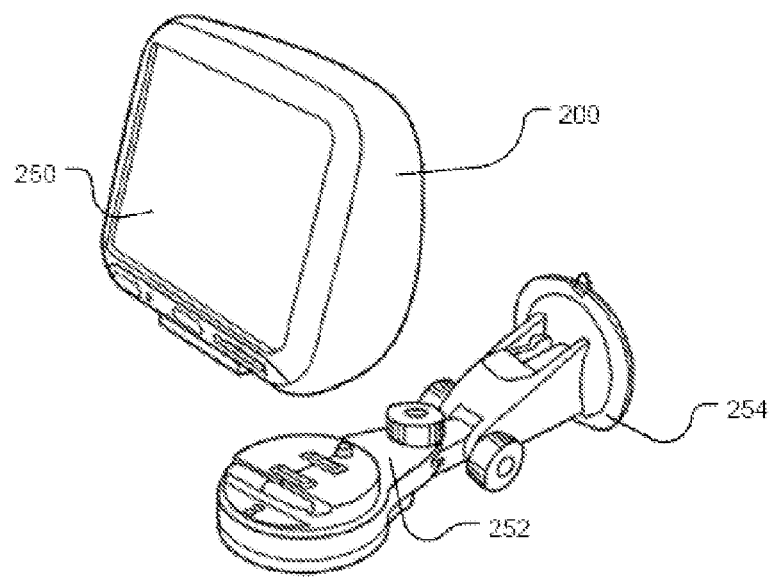
FIG. 4 is a schematic diagram of an arrangement for mounting and/or docking a navigation device.

Referring to FIG. 4, the navigation device 200 may be a unit that includes the integrated input and display device 206 and the other components of FIG. 2 (including, but not limited to, the internal GPS receiver 224, the microprocessor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

Figure 5:
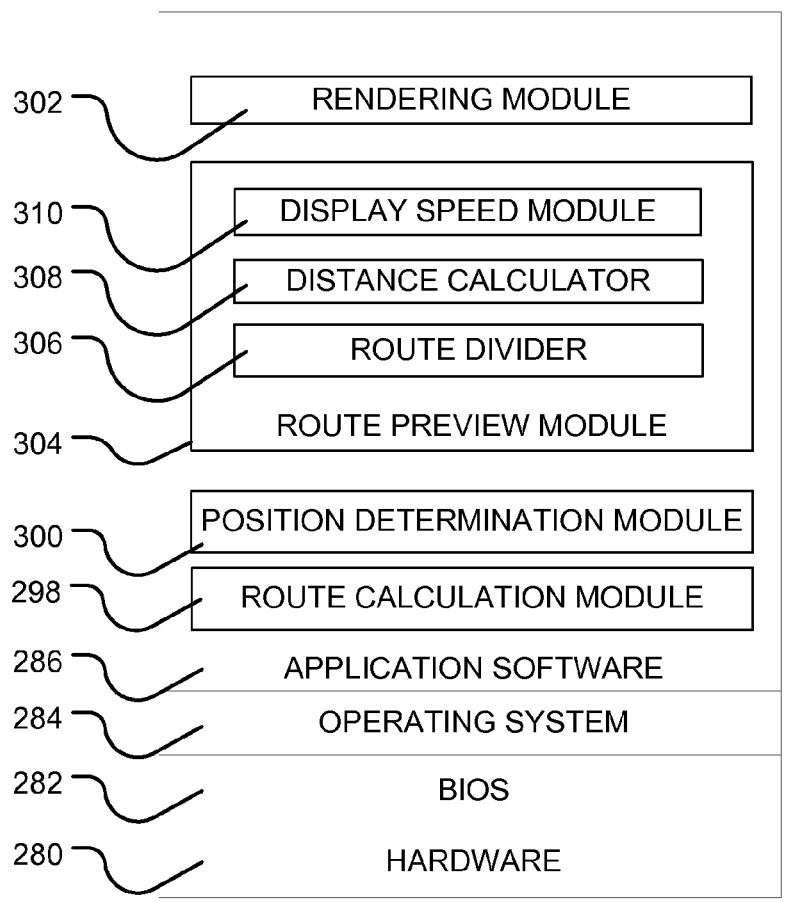
FIG. 5 is a schematic representation of an architectural stack employed by the navigation device of FIG. 3.
Figure 6:
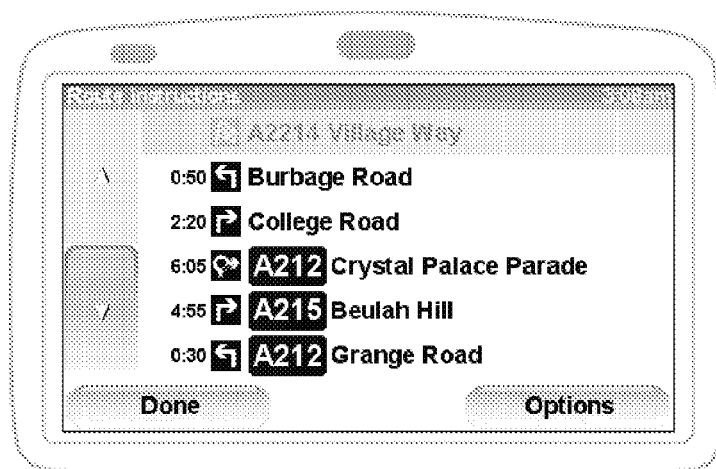
FIG. 6 is a representation illustrating textual route preview functionality.
Figure 7A:
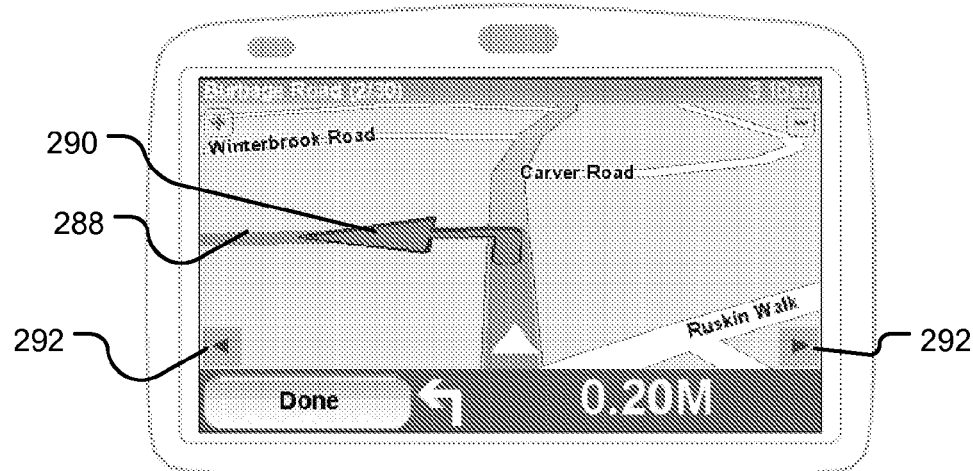
FIGS. 7a and 7b are representations illustrating static junction image route preview functionality.
Figure 7B:
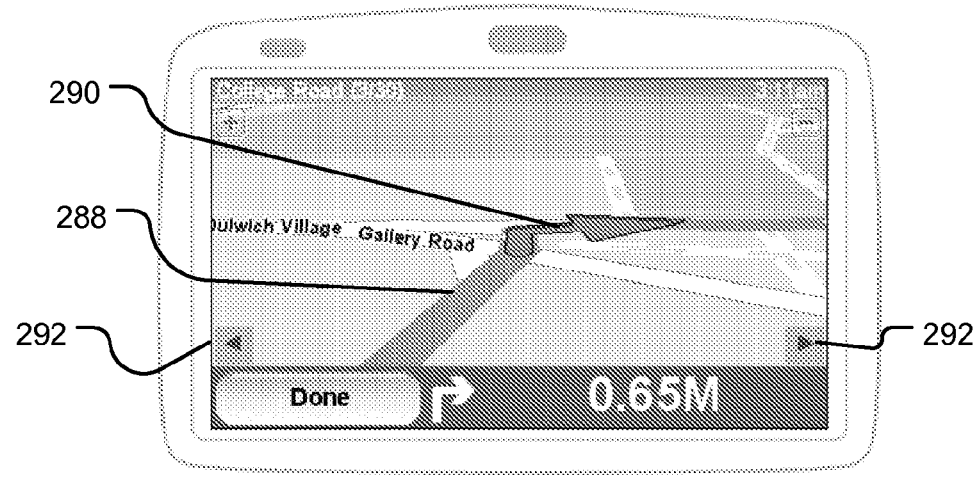

Referring to FIG. 5, the processor 202 and memory 214 of the navigation device cooperate to support a BIOS (Basic Input/Output System) 282 that functions as an interface between functional hardware components 280 of the navigation device 200 and software modules executed by the device. The processor 202 is configured to load an operating system 284, for example from memory 214, and the operating system provides a processing environment in which application software 286 can run. The application software 286 provides an operational environment including a GUI that supports core functions of the navigation device.

In this illustrative example, the application software module 286 comprises a conventional route calculation module 298 that is configured, as described above, to enable a user to specify start and destination locations and to enable the navigation device to calculate a route for the user to follow.

The application software module 286 further comprises a conventional position determination module 300 that is configured to determine the geographic position of the device from received GPS data, and a conventional rendering module 302 that is configured to render map views from map data stored in the device for geographic positions, for example the geographic position determined by the position determination module 300.

In addition to these conventional modules, the navigation device of the present invention further comprises a route preview module 304 that includes a route divider 306, a distance calculator 308 and a display speed module 310. The route preview module of the present invention, as will now be described, is configured to provide an alternative video preview of a calculated route to that previously described.

In very general terms, the route preview module of the present invention implements the appreciation that route preview functionality can be enhanced by subjecting the route replay to differential acceleration, in particular by accelerating those parts of the route that are of less significance to the user (in particular, segments of the route that are between junctions) to a greater extent than parts of the route that are of more significance to the user (in particular, segments of the route that include a junction), which may not in fact be accelerated at all. In this way, the total time required to replay a given route is more dependent on the number of junctions in the route than the length of the overall route, and as a result in many instances the time required to view a video preview of a route in its entirety can be reduced, advantageously without affecting the information that the user can derive from the route preview.

To implement this functionality, the route preview module 304 comprises a route divider 306, a distance calculator 308 and a display speed module 310.

The route divider 306 is configured to analyse a route calculated by the route calculation module 298 and divide that route (at least notionally) into route components where a junction is traversed (hereafter referred to as junction segments) and route components between junctions (hereafter referred to as road segments). Junction segments are defined as being a set of geographic locations along a calculated route that include a geographic location corresponding to a junction, as well as all geographic locations along the calculated route within a predetermined distance (for example 50 to 300 metres) to either side of the junction. Road segments are defined as being a set of geographic locations that commences with the first geographic location outside of a junction segment, and finishes with the last geographic location before the next junction segment along the route.

The distance calculator 308 is configured to calculate the distance (i.e. length) of each of the road segments identified by the route divider 306, and the display speed module 310 is configured to calculate a display speed for road segments, where the display speed is increased as the distance of the road segment (as calculated by the distance calculator 308) increases. As will be appreciated by persons skilled in the art the "display speed" constitutes the number of rendered images that are displayed per unit time, or in normal parlance the frame rate or number of frames per second.

Figure 9:
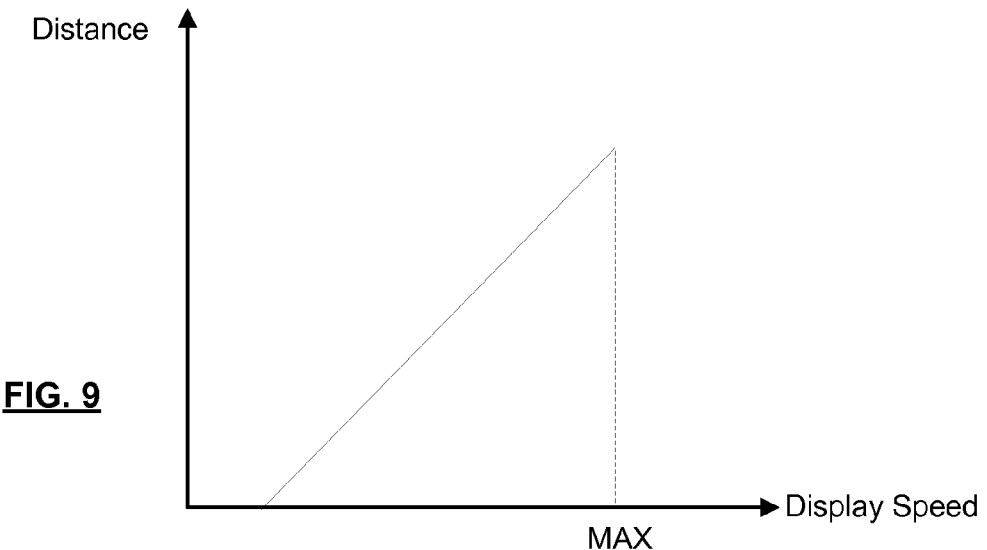
FIG. 9 is a graph of distance versus display speed.

As shown in FIG. 9, the display speed module 310 is, in the preferred arrangement, configured to linearly increase the display speed with increasing road segment distance, as calculated by the distance calculator 308, up to a maximum frame rate "MAX" supported by the video processor of the navigation device.

Figure 8A:
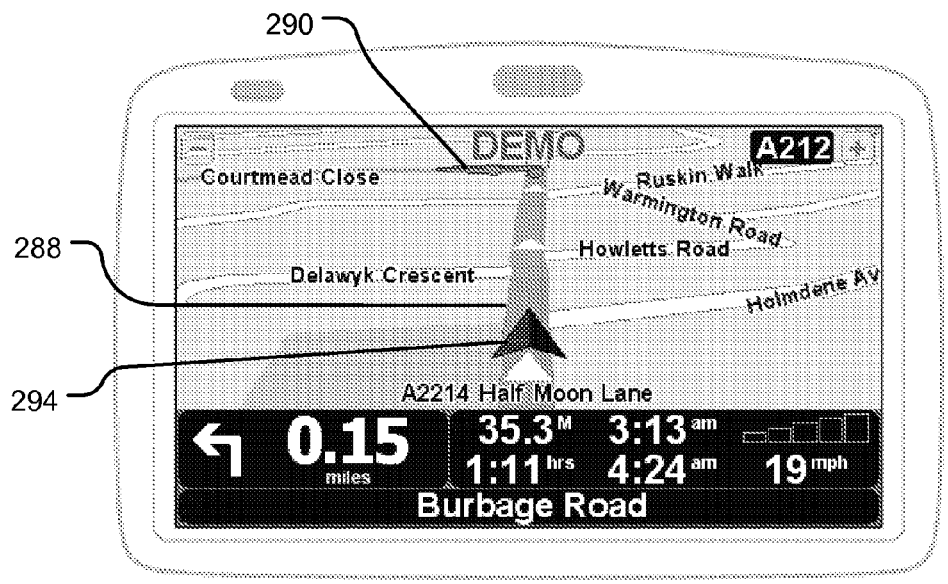
FIGS. 8a and 8b are representations illustrating current video route preview functionality.
Figure 8B:
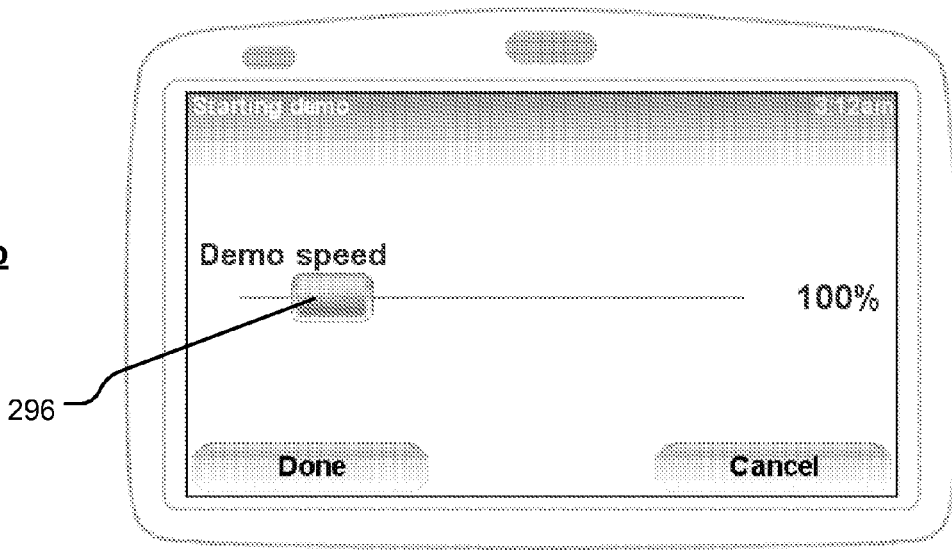

The display speed module 310 is configured to select a lower display speed for junction segments, and in a particularly preferred arrangement the display speed for junction segments may be user settable—for example by means of a slider of the type depicted in FIG. 8*b*. In this way the user is provided with the ability to set a junction segment display speed that they are comfortable with, and in particular is not so fast that they cannot appreciate the information shown. In a particularly preferred embodiment a virtual vehicle is superimposed on the images that make up the junction segment to thereby provide an animation of the virtual vehicle moving through the junction.

The rendering module 302 is configured, in the usual way, to render images using retrieved map data for particular locations to provide images for display on the display 206 of the navigation device 200.

However, in this embodiment of the present invention the rendering module 302 cooperates with the display speed module 310, the route divider 306, and the route calculation module 298 to retrieve map data for locations on a calculated route, to render images for display, and to display successive rendered images of segments of the route (as identified by the route divider 306) at a display rate determined by the display speed module 310 for the type of route segment currently being rendered. In particular, the display speed module is configured to display junction segments of a route at a first display speed (which may be a default speed or a user selected speed), and to display road segments of the route at a higher display speed that varies in accordance with the length of the road segment in question.

In one implementation the display speed module is configured to smoothly increase and decrease (in conventional parlance, ramp up and ramp down) the display speed between adjacent route segments. This arrangement is particularly preferred because it avoids abrupt step changes in frame rates and hence improves the quality of the displayed video, as perceived by the user.

Figure 10:
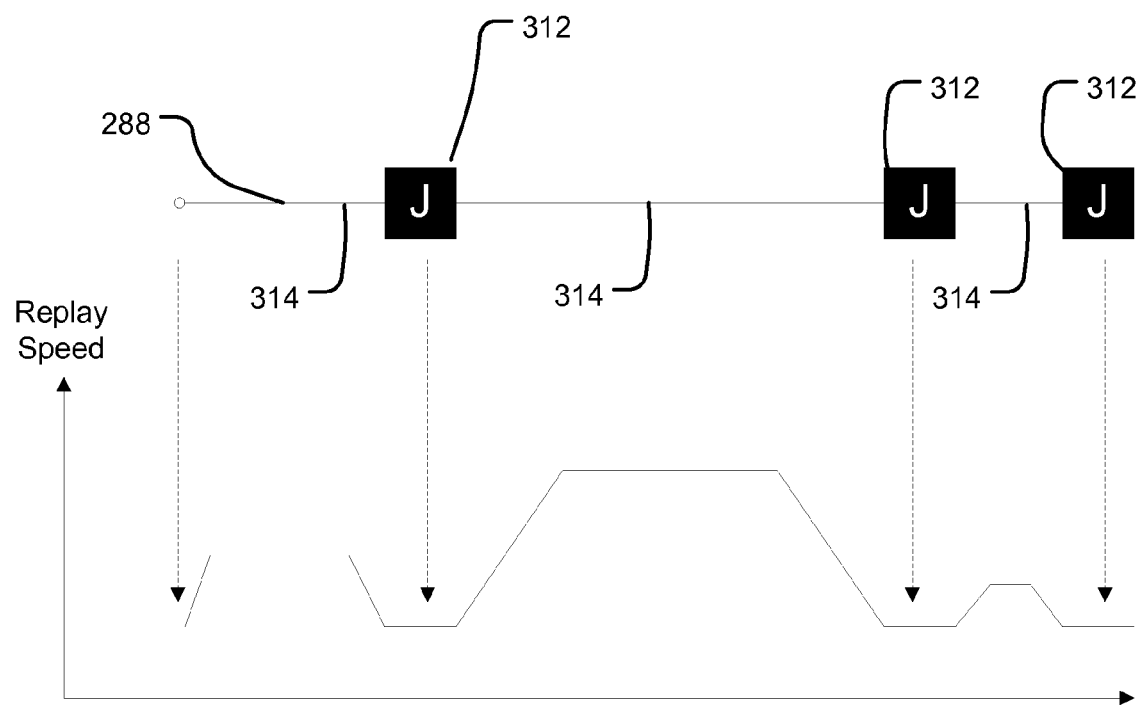
FIG. 10 is a schematic representation of a route and illustrative display speed variations.

Referring now to FIG. 10 of the accompanying drawings, there is shown an illustrative representation of a calculated route 288 which consists of a series of junction segments 312 and road segments 314, and underneath the route a graph that schematically depicts the display speed at which rendered images are displayed for the route.

Starting from the left hand side of FIG. 10, the display speed module slowly ramps up the display speed to a first display speed calculated by the display speed module 310 for this first road segment length. The display speed slowly ramps down to a lower junction segment display speed for the first junction segment, whereupon the display speed ramps up to a second display speed that is higher than the first (because the second road segment is longer than the first, and hence has a higher display speed as calculated by the display speed module 310), before ramping down to the lower junction segment display speed (which in this instance is the same as the display speed for the first junction segment) for the second junction segment. The display speed then ramps up to a third display speed (that is smaller than the first display speed because the associated road segment is shorter) before ramping down to the aforementioned junction segment display speed.

In this embodiment of the present invention the display speed module is configured to increase the display speed of the road segments in accordance with their length up to a maximum frame rate supported by the video processor of the navigation device 200. In another particularly preferred embodiment, for road segment lengths where the calculated display speed would correspond to a frame rate that exceeds the maximum permissible frame rate, the display speed module 310 may control the rendering module 302 to effect a frame culling process whereby selected frames from a queue of frames that are to be rendered are culled to bring the effective rate of image display down below the maximum supported frame rate of the video processor of the navigation device 200. In effect this culling process would correspond to discarding geographic locations from the rendering process, but as the route segments concerned do not include any junctions it is anticipated that the overall quality of the video should not be adversely affected to an appreciable degree.

In another embodiment of the present invention, the user may be provided with the option of discarding road segments from display, and in such an arrangement the route display would appear superficially similar to the previously proposed static display of junctions except that in this instance the junctions would be animated to show a virtual vehicle travelling through the junction. In such an arrangement it is preferred for video of a given junction to be faded in and faded out (or other conventional video effects) to be employed to improve the overall appearance of the video and avoid abrupt jumps between images.

Figure 11:
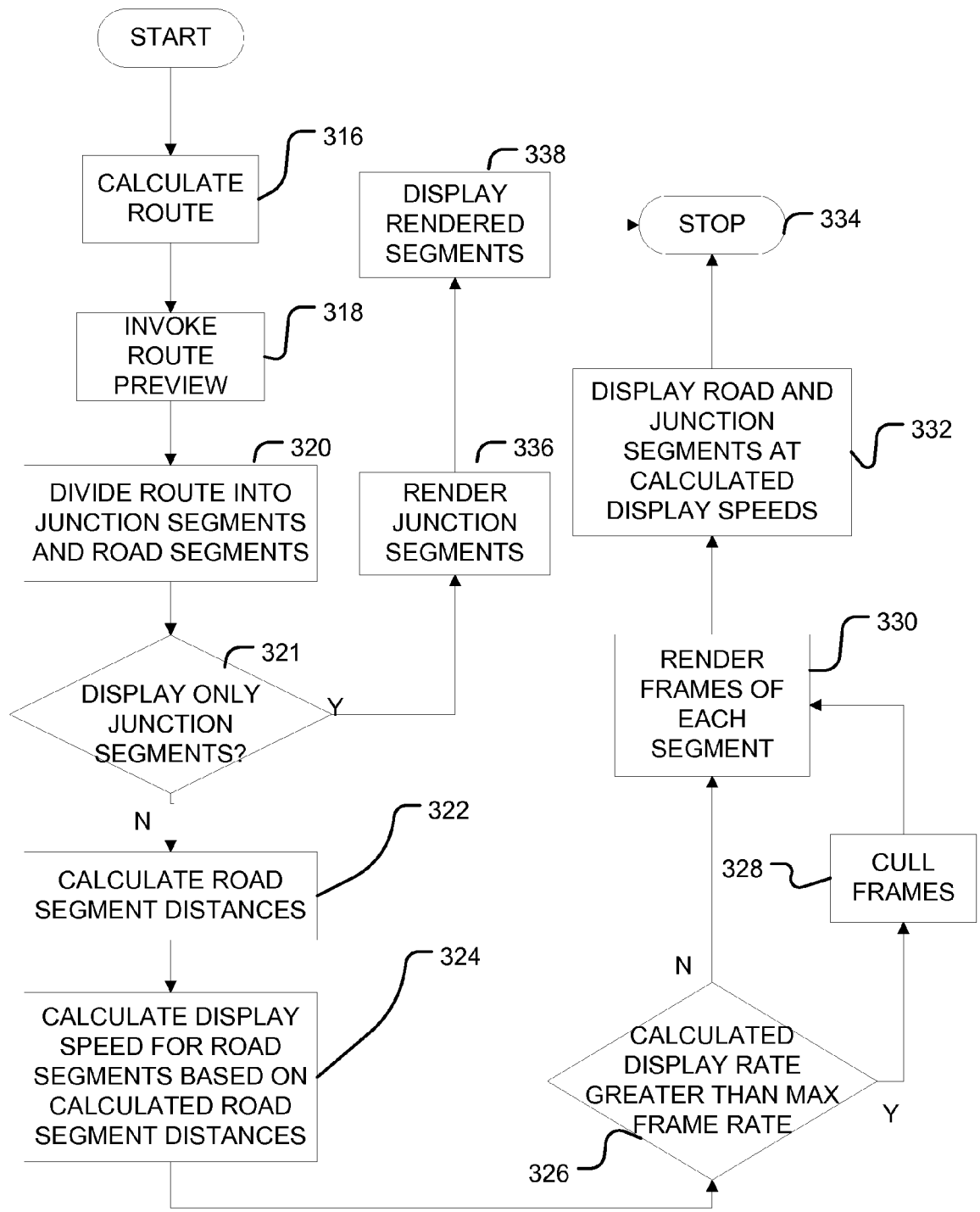
FIG. 11 is a flow diagram illustrating the functionality of a preferred embodiment of the present invention.

A general overview of a process implemented by an embodiment of the present invention is provided in the form of a flow diagram in FIG. 11 of the accompanying drawings.

Referring to FIG. 11, in a first step 316, the navigation device is operated to calculate a route from a start location to a destination. In a second step 318, the navigation device is controlled, for example by selecting an option from a menu displayed on display device 207, to invoke route preview functionality. Once this functionality has been invoked the route divider module 306, in step 320, divides the route calculated in step 316 into junction segments and road segments, following which the route preview module 304 calculates the distances of each road segment in step 322.

Next, in step 321, the user is provided with the option to display only junction segments, and if the user should accept this option processing moves to step 336 and the images of the junctions segments are rendered, following which the junctions segments are displayed in step 338 (implementing the aforementioned animation of a virtual vehicle moving through the junction, and optionally video processing techniques to smooth the transition from one displayed segment to the next displayed segment). Once all junction segments in the route have been displayed, the route preview process ceases in step 344.

If the user opts not to display only the junction segments in step 321, processing moves to step 324 and the display speed module 310 calculates a display speed for each road segment based on the length of the segment previously determined in step 322. The route preview module 304, in particular the display speed module 310, then determines in step 326 whether the display speed calculated for each road segment in step 324 would exceed the maximum supported display speed for the video processor, and if the display speed is determined to be too great, selected frames of each segment for which the display speed exceeds the maximum are culled in step 328 until the effective display speed is reduced to below the maximum.

Next the frames that constitute each segment (i.e. road and junction segments) are rendered in step 330 (noting that some road segment frames may have been culled), following which the road and junction segments are displayed in step 332, with the road segments being displayed at the rate calculated in step 324.

Once the entire route has been displayed, processing ceases at step 334, and the route preview module 304 terminates.

It will be appreciated from the foregoing that the teachings of the present invention provide a powerful means for improving upon existing route preview functionality. In particular the teachings of the present invention can enable the time required to preview a given route to be reduced, and as such it is anticipated that the route preview functionality herein described will be less tedious than existing arrangements, and hence that users will be more likely to avail themselves of this functionality when using their navigation device 200.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, although the above embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

In addition to the foregoing, whilst the present application has made particular reference to junctions herein, it should be noted that junction segments need not necessarily include a turning from one road to another. Junction segments are intended to encompass all relatively complicated road layouts (including, for example, roundabouts, flyovers, diverting lanes)—as compared with a road segment where the user does not deviate from a given street—that a user might be interested in previewing. As such the term junction should not be interpreted as being limited solely to junctions where the route traverses from one street to another different street.

In another modification of the teachings disclosed, the display speed module could be configured to implement a fixed (or optionally user definable) higher display speed for road segments than junction segments. Whilst this arrangement would not be as efficient as an arrangement whereby the display speed is varied in accordance with road segment length, it would nevertheless provide an improvement over existing route preview functionality. In another modification, the functionality whereby conventional route preview of static junction images is replaced by animated video of vehicles traversing the junction may be provided separately from the other embodiments disclosed herein, in particular the adjustment of display rate with route segment type.

Another point that will again be well understood by persons of ordinary skill in the art is that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:
1. A navigation device comprising:
a route calculation module operable to calculate a route from a start location to a destination location;
a rendering module configured to use digital map data to generate images of said route for display to a user; and
a route preview module operable to provide the user with a preview of the calculated route, wherein:
the route preview module is operable to divide said calculated route into junction segments and road segments, calculate a length of each said road segment of the calculated route, and is configured to control said rendering module to display images representative of locations within said road segments at a higher display speed than images representative of locations within said junction segments and vary the display speed of road segments based on the calculated lengths of road segments.

2. A navigation device according to claim 1, wherein said route preview module includes a route divider module configured to divide a calculated route into road segments and junction segments.

3. A navigation device according to claim 1, wherein the route preview module is configured to vary the display speed of successive road segments.

4. A navigation device according to claim 1, wherein said route preview module comprises a display speed module configured to calculate a display speed for road segments according to calculated road segment distances.

5. A navigation device according to claim 1, wherein said display speed module is configured to linearly increase the display speed of road segments with increase road segment distance.

6. A navigation device according to claim 1, wherein said route preview module is configured to control said rendering module to gradually increase the display speed in the region of a transition between a junction segment and a road segment, and to gradually decrease the display speed in the region of a transition between a road segment and a junction segment.

7. A navigation device according to claim 1, wherein the route preview module is controllable to cause said rendering module to generate images representative of locations within junction segments.

8. A navigation device according to claim 7, wherein said rendering module is configured to implement video processing techniques to smooth transitions from one displayed junction segment to another.

9. A navigation device according to claim 1, wherein said display speed module is configured to determine whether a calculated display speed for each road segment exceeds a maximum display speed for a processor of said navigation device.

10. A navigation device according to claim 9, wherein said display speed module is configured to control said rendering module to cull images for rendering in the event that a calculated display speed for a road segment exceeds a maximum display speed for a processor of said navigation device.

11. A method of operating a navigation device comprising:
controlling a route calculation module to calculate a route from a start location to a destination location;
controlling a rendering module to use digital map data to generate images of said route for display to a user;
controlling a route preview module to provide the user with a preview of the calculated route; and
dividing said calculated route into junction segments and road segments;
calculating a length of each said road segment of the calculated route; and
controlling said rendering module to display images representative of locations within said road segments at a higher display speed than images representative of locations within said junction segments and varying the display speed of road segments based on the calculated lengths of road segments.

12. A method according to claim 11, comprising the step of varying the display speed of successive road segments.

13. A non-transitory computer program comprising one or more computer program modules configured, when executed by a processor resource, to cause the processor resource to implement a method of operating a navigation device, the method executed by the set of instructions comprising:
controlling a route calculation module to calculate a route from a start location to a destination location;
controlling a rendering module to use digital map data to generate images of said route for display to a user;
controlling a route preview module to provide the user with a preview of the calculated route; and
dividing said calculated route into junction segments and road segments;
calculating a length of each said road segment of the calculated route; and
controlling said rendering module to display images representative of locations within said road segments at a higher display speed than images representative of locations within said junction segments and varying the display speed of road segments based on the calculated lengths of road segments.

* * * * *